Patented May 2, 1933

1,907,369

UNITED STATES PATENT OFFICE

STEFAN SCHLESS, OF GRODIG NEAR SALZBURG, AUSTRIA, ASSIGNOR OF ONE-HALF TO STEFAN SCHLESS, OF GRODIG NEAR SALZBURG, AUSTRIA, AND ONE-HALF TO KARL HOLLER, OF SALZBURG, AUSTRIA

PROCESS FOR THE MANUFACTURE OF ARTIFICIAL STONES FROM LIME

No Drawing. Application filed November 9, 1931, Serial No. 574,041, and in Austria April 16, 1929.

Applications have been filed in Austria on the 16th April 1929, in Czechoslovakia on the 19th February 1930 and in Germany on the 8th April 1930.

This invention relates to a process for the manufacture of a stone-like material possessing a chonchoidal finely granulated fracture like terracotta.

By the present process it is possible to produce artificial stones of a pure white colour, which are free of all secondary constituents and possess a degree of hardness similar to that of burnt clay. According to the present process, burnt lime is slaked in a large quantity of water and subsequently, together with a filling material, is passed through mixers, sieves, washing and filtering apparatus of the kind used in the manufacture of potter's ware and by which the finest particles of the mixture are thoroughly mixed with one another.

Any pulverulent mineral substances, which are wholly or substantially chemically inert in the mixture, can be used as filling material such as for instance pulverulent calcium carbonate, pulverized stone of any kind and also infusorial earth. Then according to the present invention the water is forced out of the mixture for instance by means of a filter press. The degree of the extraction of water depends on the filling material and the kind of artificial stone to be manufactured. The extraction may be carried out for instance in such a manner, that approximately 30% moisture remain in the pressed cakes. Hereafter the latter are artificially dried until they are apt for being treated by edge rollers or another grinding apparatus. By this treatment the pressed and dried material is finely divided and considerably improved. In case the artificial stone to be manufactured ought to be particularly resistant against wear, the milled or ground material is intimately mixed with an additional substance which increases the degree of hardness, such as silicium carbide in a comminuted state or quartz-grains or a mixture of both. The diameter of the said quartz-grains may for example be 2–3 millimetres. The power of resistance of the final product particularly depends on the possibly uniform admixture of these hard additional substances as well as on a possibly minute refinery by means of the edge rollers or another grinding apparatus.

Next the material is pressed into plates or members of any convenient shape and the pressed bodies are treated with carbonic acid.

*Example.*—The mass may for instance consist of lime milk, containing approximately 30 parts in weight burnt lime and 70 parts in weight water, and a filling material such as for instance calcium carbonate. The percentage in weight between lime milk and filling material may be 70 by 30. This mass is washed, filtered in a filter press, dried up to about 6% of moisture, treated by grinding and pressed into the shape of cakes by a pressure of approximately 600 kilograms per square centimetre. The cakes thus produced are subjected to the action of carbonic acid for about 21 days. After the elapse of this period the compressive strength of the stone amounts to approximately 1250 kilograms per square centimetre and the same shows a coefficient of wear of 44 cubic centimetres per 50 square centimetres according to Bauschinger. The mode of carrying out the test according to Bauschinger is described for instance in the "Lexikon der gesamten Technik" by Otto Lueger, Stuttgart 1929, volume 6, page 381, section "Steinprüfung".

However if a substance such as quartz is added to the above pulverulent mixture and if the same is subjected to the action of carbonic acid for 21 days, a stone will be obtained of a compressive strength of 700 kg per square centimetre and possessing a coefficient of wear of 22 cubic centimetres per 50 square centimetres according to Bauschinger.

The addition of a material composed of 50% quartz sand and 50% silicium carbide still more increases the power of resistance. Now the compressive strength amounts to 600 kilograms per square centimetre and the coefficient of wear to 11 cubic centimetres per 50 square centimetres according to Bauschinger.

Also silicium carbide alone may be employed as additional substance.

The manufacture of artificial stones from lime in the hitherto known manner was connected with difficulties in the mode of preparing and mixing the necessary materials, because the lime was hydrated with a small amount of water so that it was in a dry state, hereafter the materials were ground and mixed with the additional material in a dry condition and subsequently the mixture was stored in silos for 3 to 4 weeks. By this means a thorough mixing was not achieved and therefore the stones thus produced possessed a small compressive strength.

Contrary to this, according to the present invention the lime is perfectly slaked and freed of any by-products and detrimental constituents, further the particles of lime and of the filling materials are thoroughly mixed and uniformly combined with one another in that the latter are completely enclosed in the lime. Therefore stones manufactured according to the present process possess a compressive strength up to 1250 kilograms per square centimetre, while the stones produced from calcium hydrate by dry mixing, only possess a compressive strength of 400 kilograms per square centimetre.

I claim:—

1. A process for the manufacture of artificial stones from lime which consists in slaking the lime by a large quantity of water, adding a filling material to the so prepared lime, washing and sieving the mixture to remove any impurities and to intimately mix the lime with the filling material in the watery medium, forcing out the water from the mass, drying the resulting mixture to a convenient extent, grinding the dried mixture, compressing the latter to the desired shapes and treating the pressed bodies with carbonic acid.

2. A process for the manufacture of artificial stones from lime which consists in slaking the lime by a large quantity of water and freeing the lime of by-products and detrimental constituents, adding a mineral filling material to the so prepared lime, intimately mixing the lime with the finely divided filling material in the watery medium, forcing out the water from the mass to reduce the water content to about 30%, drying the resulting mixture to approximately 6% water content, grinding the dried mixture, compressing the latter to the desired shapes and treating the pressed bodies with carbonic acid.

3. A process for the manufacture of artificial stones from lime which consists in slaking the lime by a large quantity of water and freeing the lime of by-products and detrimental constituents, adding a mineral filling material to the so prepared lime, intimately mixing the lime with the finely divided filling material in the watery medium, reducing the water content of the mixture to approximately 6%, grinding the dried mixture, compressing the latter to the desired shapes and treating the pressed bodies with carbonic acid.

In testimony whereof I affix my signature.

STEFAN SCHLESS.